United States Patent
Laramee et al.

(10) Patent No.: US 9,927,322 B2
(45) Date of Patent: Mar. 27, 2018

(54) ROTORCRAFT ACTUATOR SEAL LEAKAGE MONITOR

(71) Applicant: Bell Helicopter Textron Inc., Fort Worth, TX (US)

(72) Inventors: Robert Michael Laramee, Fort Worth, TX (US); Carlos Fenny, Arlington, TX (US)

(73) Assignee: BELL HELICOPTER TEXTRON INC., Fort Worth, TX (US)

(*) Notice: Subject to any disclaimer, the term of this patent is extended or adjusted under 35 U.S.C. 154(b) by 168 days.

(21) Appl. No.: 14/254,117

(22) Filed: Apr. 16, 2014

(65) Prior Publication Data

US 2015/0300908 A1    Oct. 22, 2015

(51) Int. Cl.
*G01M 3/28* (2006.01)
*B64D 45/00* (2006.01)
(Continued)

(52) U.S. Cl.
CPC ........... *G01M 3/2853* (2013.01); *B64D 45/00* (2013.01); *G01F 23/0007* (2013.01); *G01F 23/292* (2013.01); *G01F 23/296* (2013.01); *G01F 23/2966* (2013.01); *G01M 3/2869* (2013.01); *G01M 3/3245* (2013.01); *B64D 2045/0085* (2013.01); *G01F 23/02* (2013.01)

(58) Field of Classification Search
CPC ............. G01M 3/2853; G01M 3/2869; G01M 3/2845; G01M 3/3245; B64D 45/00; B64D 2045/0085; F15B 19/005; F16J 15/004; F16J 15/3492; G01F 23/0007; G01F 23/02; G01F 23/292; G01F 23/296; G01F 23/2966

USPC ......... 73/323, 1.73; 92/165 R; 277/320, 457, 277/514, 552; 116/201; 417/63; 702/34
See application file for complete search history.

(56) References Cited

U.S. PATENT DOCUMENTS 3,248,946 A * 5/1966 Lichtenberg ............ G01F 23/02
                                                    116/276
3,623,053 A   11/1971 Meyer
(Continued)

FOREIGN PATENT DOCUMENTS

| DE | 10047586 | 6/2002 |
| EP | 2626616 | 8/2013 |
| WO | 2011153985 | 12/2011 |

OTHER PUBLICATIONS

Non-Patent Literature "Flow Measurement", accessed at http://web.archive.org/web/2012917082120/https://en.wikipedia.org/wiki/Flow_measurement, archived on Sep. 17, 2012.*

(Continued)

*Primary Examiner* — Peter Macchiarolo
*Assistant Examiner* — Irving A Campbell

(57) ABSTRACT

A rotorcraft actuator monitoring system to monitor leakage past dynamic rotorcraft actuator seals of a rotorcraft actuator includes a body member and a fluid level indication housing attached to the body member. The body member is mounted to surround a dynamic rotorcraft actuator seal that seals fluid in a rotorcraft actuator, where the body member captures fluid that leaks past the dynamic rotorcraft actuator seal. The fluid level indication housing collects the fluid captured by the body member and indicates that a predetermined volume of fluid that leaked past the dynamic rotorcraft actuator seal has been collected.

19 Claims, 6 Drawing Sheets

(51) Int. Cl.
*G01F 23/00* (2006.01)
*G01F 23/292* (2006.01)
*G01F 23/296* (2006.01)
*G01M 3/32* (2006.01)
G01F 23/02 (2006.01)

(56) References Cited

U.S. PATENT DOCUMENTS

| | | | | |
|---|---|---|---|---|
| 4,115,754 | A * | 9/1978 | Duzich | G01C 25/00 340/521 |
| 2003/0015840 | A1 | 1/2003 | Davis | |
| 2005/0093246 | A1* | 5/2005 | Dietle | F16J 15/008 277/549 |
| 2005/0096873 | A1* | 5/2005 | Klein | G01H 1/006 702/184 |
| 2008/0015796 | A1* | 1/2008 | Dlugosch | F15B 15/14 702/34 |
| 2010/0049379 | A1 | 2/2010 | Vial | |
| 2012/0004794 | A1 | 1/2012 | Guilley et al. | |
| 2013/0276516 | A1* | 10/2013 | Tabor | G01M 99/008 73/37 |
| 2014/0203630 | A1* | 7/2014 | Gmirya | G01F 23/02 307/9.1 |

OTHER PUBLICATIONS

European Search Report issued in European Application No. 14175970.4 on Dec. 19, 2014; 3 pages.
Office action issued in Canadian Application No. 2,888,441, dated Jun. 27, 2016; 5 pages.

* cited by examiner

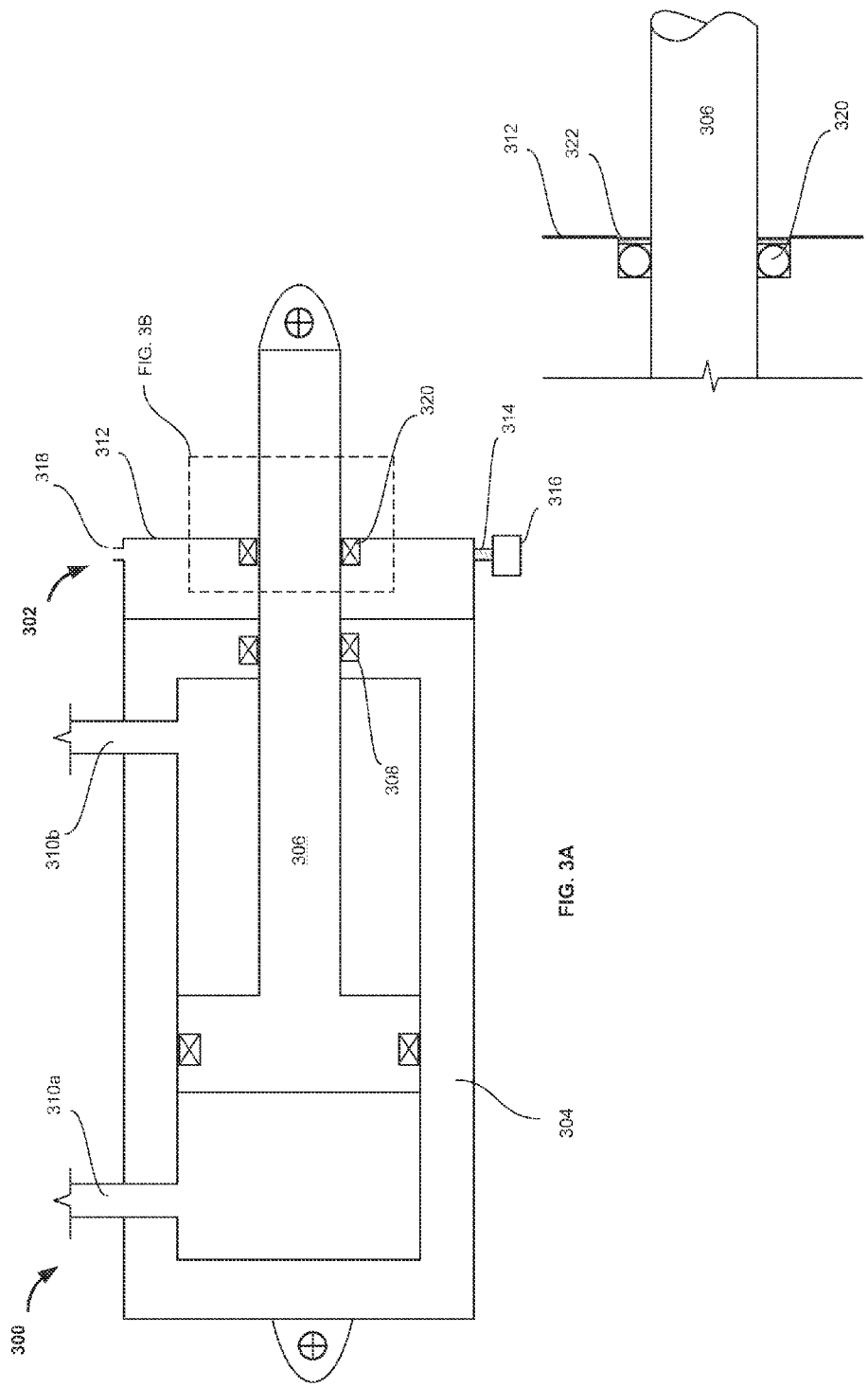

ROTORCRAFT ACTUATOR SEAL LEAKAGE MONITOR

TECHNICAL FIELD

This disclosure relates to leakage in actuators, e.g., rotorcraft actuators or other actuators.

BACKGROUND

Hydraulic actuators are used in rotorcrafts such as helicopters and airplanes to transmit motion and/or control positioning of an element of the rotorcraft. A hydraulic actuator includes a dynamic actuator seal to restrain hydraulic fluid from leaking out of a housing of the actuator. Dynamic actuator seals wear down and leak based on a number of factors. Replacement and maintenance of hydraulic actuators with dynamic actuator seals are sometimes based on subjective viewing of actuators by actuator maintenance technicians, and/or based on total usage time.

SUMMARY

This disclosure describes actuator monitoring systems to monitor leakage past dynamic actuator seals of an actuator.

Certain aspects encompass, a rotorcraft actuator monitoring system to monitor leakage past dynamic rotorcraft actuator seals of a rotorcraft actuator. The rotorcraft actuator monitoring system includes a body member and a fluid level indication housing attached to the body member. The body member is mounted to surround a dynamic rotorcraft actuator seal that seals fluid in a rotorcraft actuator, where the body member captures fluid that leaks past the dynamic rotorcraft actuator seal. The fluid level indication housing collects the fluid captured by the body member and indicates that a predetermined volume of fluid that leaked past the dynamic rotorcraft actuator seal has been collected.

Certain aspects encompass, an actuator monitoring system to monitor leakage past dynamic actuator seals of a machine actuator, the system comprising a body member, a fluid collection member included in the body member, a fluid level indication housing attached to the fluid collection member, and a computer system. The body member is mounted to surround a dynamic machine actuator seal that seals fluid in a rotorcraft machine actuator. The body member captures fluid that leaks past the dynamic machine actuator seal. The fluid collection member receives the fluid that leaks past the dynamic machine actuator seal into the body member. The fluid level indication housing collects the fluid received by the fluid collection member and indicates that a predetermined volume of fluid that leaked past the dynamic machine actuator seal has been collected. The computer system includes one or more processors and a computer-readable medium storing computer instructions executable by the one or more processors to perform operations. The operations include receiving a signal in response to the fluid level indication housing indicating that the predetermined volume of fluid that leaked past the dynamic machine actuator seal has been collected, receiving a plurality of machine parameters, and determining if the machine actuator needs maintenance based, in part, on the received signal and one or more of the machine parameters. Each machine parameter is associated with a rotorcraft operation.

Certain aspects encompass a method for monitoring leakage past a dynamic actuator seal of a rotorcraft actuator. The method includes surrounding a dynamic actuator seal that seals fluid in a rotorcraft actuator with a body member configured to capture fluid that leaks past the dynamic actuator seal, receiving the fluid that leaks past the dynamic actuator seal into the body member in a fluid collection member attached to the body member, collecting the fluid that leaks past the dynamic actuator seal into a fluid level indication housing attached to the fluid collection member, determining that a predetermined volume of fluid has been collected in the fluid level indication housing, and providing an indication that the predetermined volume of fluid has been collected.

The aspects above can include some, none, or all of the following features. The rotorcraft actuator monitoring system includes a signal transmission system connected to the fluid level indication housing to transmit a signal in response to the fluid level indication housing indicating that the predetermined volume of fluid that leaked past the dynamic rotorcraft actuator seal has been collected. The signal transmission system includes an electrical signal transmitter connected to the fluid level indication housing, and the signal includes an electrical signal. The signal transmission system includes an optical system connected to the fluid level indication housing, and the signal includes an optical signal. The optical system includes a fiber optic system, and the optical signal transmitted through an optical fiber of the fiber optic system is modulated in response to the fluid level indication housing indicating that the predetermined volume of fluid that leaked past the dynamic rotorcraft actuator seal has been collected. The optical system includes a photocell to generate the optical signal in response to the fluid level indication housing indicating that the predetermined volume of fluid that leaked past the dynamic rotorcraft actuator seal has been collected. The signal transmission system includes a sonic system connected to the fluid level indication housing to monitor a resonance frequency of the fluid collection member. The rotorcraft actuator monitoring system includes a fluid collection member included in the body member to receive the fluid that leaks past the dynamic rotorcraft actuator seal into the body member. The fluid level indication housing is attached to the fluid collection member to collect the fluid received by the fluid collection member. The sonic system is configured to transmit the signal in response to determining that the monitored resonance frequency of the fluid collection member substantially matches a baseline resonance frequency of the fluid level indication housing filled with the predetermined volume of fluid. The rotorcraft actuator monitoring system includes a computer system connected to the signal transmission system, and the computer system is configured to receive the signal from the signal transmission system, receive a plurality of parameters representing operation of the rotorcraft in which the actuator is installed, and determine if a repair of the rotorcraft actuator is necessary based, in part, on the signal and one or more of the plurality of parameters. The fluid level indication housing includes a marking at a position that corresponds to the predetermined volume of fluid. The fluid level indication housing includes a plurality of graduation markings to identify a volume of fluid that the fluid level indication housing has collected. The rotorcraft actuator monitoring system includes a seal to seal captured fluid that leaks past the dynamic actuator seal in the body member, and a retainer to retain the seal in the body member. The retainer includes at least one of a retention ring or a groove formed in the body member. The body member is mounted to surround a shaft of the rotorcraft actuator. The body member includes a port to vent pressure generated by actuating motion of the shaft. The actuator monitoring system includes a signal transmission system connected to the fluid level indication housing, and the signal transmission system transmits the signal in response to the fluid level indication housing indicating that the predetermined volume of fluid that leaked past the dynamic machine actuator seal has been collected. The machine is a rotorcraft, and a machine parameter includes at least one of a number of hours for which the rotorcraft was operational in the air, a number of hours for which the rotorcraft was non-operational on the ground, a number of inches of stroke moved by the machine actuator, a number of directions of the actuator reversal, an ambient temperature of operation, a fluid temperature of operation, or the rotorcraft mission profile. The method includes receiving a signal in response to receiving the indication that the predetermined volume of fluid that leaked past the dynamic actuator seal has been collected, receiving a plurality of rotorcraft parameters, and determining if the rotorcraft actuator needs maintenance based, in part, on the received signal and one or more of the rotorcraft parameters. Each rotorcraft parameter is associated with a rotorcraft operation.

The details of one or more implementations of the subject matter described in this disclosure are set forth in the accompanying drawings and the description below. Other features, aspects, and advantages of the subject matter will become apparent from the description, the drawings, and the claims.

BRIEF DESCRIPTION OF THE DRAWINGS

FIG. 3A is a partial cross-sectional side view of an example actuator with an example actuator monitoring system.

FIG. 3B is a partial cross-sectional side view of a partial example actuator monitoring system that can be used in the example actuator monitoring system of FIG. 3A.

Like reference numbers and designations in the various drawings indicate like elements.

DETAILED DESCRIPTION

Figure 2:
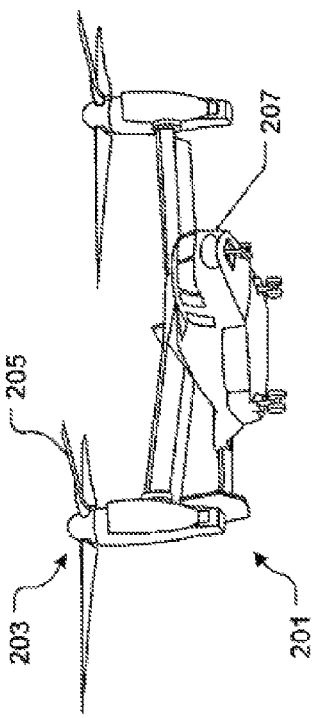
FIG. 2 is a schematic view of an example tiltrotor aircraft.
Figure 1:
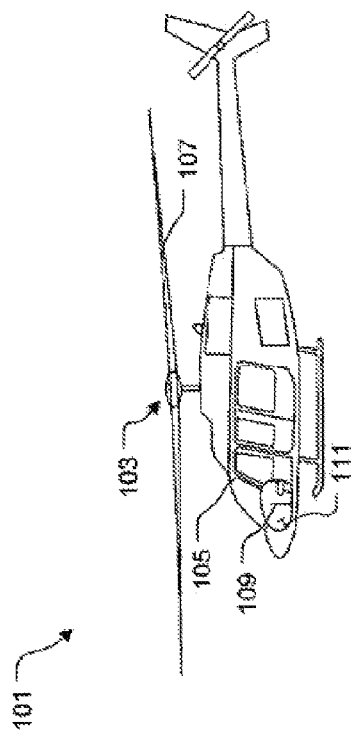
FIG. 1 is a schematic side view of an example helicopter.

This disclosure describes a rotorcraft actuator seal leakage monitor that measures fluid accumulation past a dynamic actuator seal of a rotorcraft actuator. FIG. 1 shows an example helicopter 101 that can implement a rotorcraft actuator seal monitor on one or more actuators on the helicopter 101. Similarly, FIG. 2 shows an example tiltrotor aircraft 201 that can implement a rotorcraft actuator seal monitor on one or more actuators on the tiltrotor aircraft 201. The rotorcraft actuator seal monitor can be implemented on (e.g., mounted to) any actuator of the rotorcraft, for example, the actuator implemented on rotorcraft landing gear, doors, and/or other rotorcraft components. A rotorcraft actuator seal monitor measures a specific volume of leaked fluid that leaks past a dynamic actuator seal of rotorcraft actuator. Leakage of the specific volume can serve as one of several factors that can help determine whether the rotorcraft actuator is operating normally or if the rotorcraft actuator needs to be repaired or replaced.

In some implementations, a fluid level indication housing of a rotorcraft actuator seal monitoring system allows for viewing, tracking, and/or analyzing an amount of leaked fluid past a dynamic actuator seal of an actuator. The amount of leaked fluid can be analyzed in conjunction with certain parameters related to the actuator and/or the rotorcraft in order to determine an accurate maintenance assessment of the actuator. An actuator monitoring system allows a user to accurately monitor the leakage volume and/or leakage rate, and develop threshold leak limits for timely removal, replacement, or maintenance of an actuator. In some implementations, a signal transmission system coupled with a computer system allows for automated, real-time, and precise measurements of leaked fluid past a dynamic actuator seal of an actuator. An actuator monitoring system collects leaked fluid past a dynamic seal of an actuator in a removable fluid level indication housing, allowing for proper disposal of potentially abrasive, contaminated, and/or toxic fluid (e.g., hydraulic fluid). An actuator monitoring system provides hydraulic fluid leakage information to aid in the identification of actuators requiring replacement or maintenance actions. By identifying actuator seal deterioration in actuators, deteriorated actuators may be repaired or replaced while functional actuators may be kept in operation, reducing operational maintenance costs due to premature actuator removals.

FIGS. 1 and 2 are schematic diagrams of two different rotary aircrafts. FIG. 1 is a side view of the example helicopter 101, while FIG. 2 is an oblique view of the example tiltrotor aircraft 201. Helicopter 101 comprises a rotary system 103 carried by a fuselage 105. Rotor blades 107 connected to the rotary system 103 provide flight for helicopter 101. The rotor blades 107 are controlled by multiple controllers within fuselage 105. For example, during flight a pilot can manipulate the cyclic controller 109 for changing the pitch angle of rotor blades 107 and/or manipulate pedals 111, thus providing vertical, horizontal, and yaw flight movement.

Tiltrotor aircraft 201 includes two or more rotary systems 203 having multiple proprotors 205 and carried by rotatable nacelles. The rotatable nacelles allow aircraft 201 to take-off and land like a conventional helicopter, and for horizontal flight like a conventional fixed wing aircraft. Like the helicopter 101, the tiltrotor aircraft 201 includes controls, e.g., cyclic controllers and pedals, carried within the cockpit of fuselage 207, for reacting movement of the aircraft.

A rotorcraft, such as the helicopter 101 of FIG. 1 or the tiltrotor aircraft 201 of FIG. 2, includes an actuator assembly on one or more components of the rotorcraft, for example, on rotorcraft rotor blade swashplate controls, nacelles, wing control surfaces, ramps, tail control surfaces, leading edge devices, landing gear, doors, and/or other rotorcraft components. The actuator assembly includes an actuator and an actuator monitoring system to monitor leakage past a dynamic seal of an actuator of the rotorcraft, where the dynamic seal restrains fluid from leaking out of the actuator. In some implementations, the actuator can be a hydraulic actuator, for example, a linear actuator, rotary actuator, or other type of hydraulic actuator. In certain instances, the actuator is implemented in rotorcraft rotor control actuators, control surface actuators, rotorcraft landing gear, doors, rudders, motors, valves, pumps, or other components that can utilize a hydraulic actuator. The actuator assembly can be implemented in various actuator applications where hydraulic actuator seal leakage monitoring is desired, for example, in airplanes, machinery, and other applications.

As shown in FIG. 3A, an example actuator 300 with an example actuator monitoring system 302 that can be used in the actuator assembly of FIGS. 1 and 2 is shown in a partial cross-sectional side view. The example actuator 300 (e.g., a hydraulic actuator) includes an actuator housing 304, a shaft 306 through the actuator housing 304, a dynamic actuator seal 308 between the shaft 306 and the actuator housing 304, and hydraulic fluid outputs 310a and 310b. The shaft 306 is configured to translate along a longitudinal axis (e.g. center longitudinal axis A-A) of the shaft 306 in response to differential pressure in hydraulic fluid from the hydraulic fluid outputs 310a and 310b. In some implementations, the shaft 306 can be a cylinder, and the actuator housing 304 can include a cylindrical aperture through which the shaft 306 translates. In some implementations, the shaft 306 is a different shape, and the aperture in the housing 304 matches the shape of the shaft 306. The dynamic actuator seal 308 seals hydraulic fluid from leaking out of the actuator housing 304 where the shaft 306 exits the actuator housing 304. The dynamic actuator seal 308 can include an O-ring, reciprocating seal, rotary seal, radial seal, a combination of these, or another kind of dynamic seal.

Figure 3C:
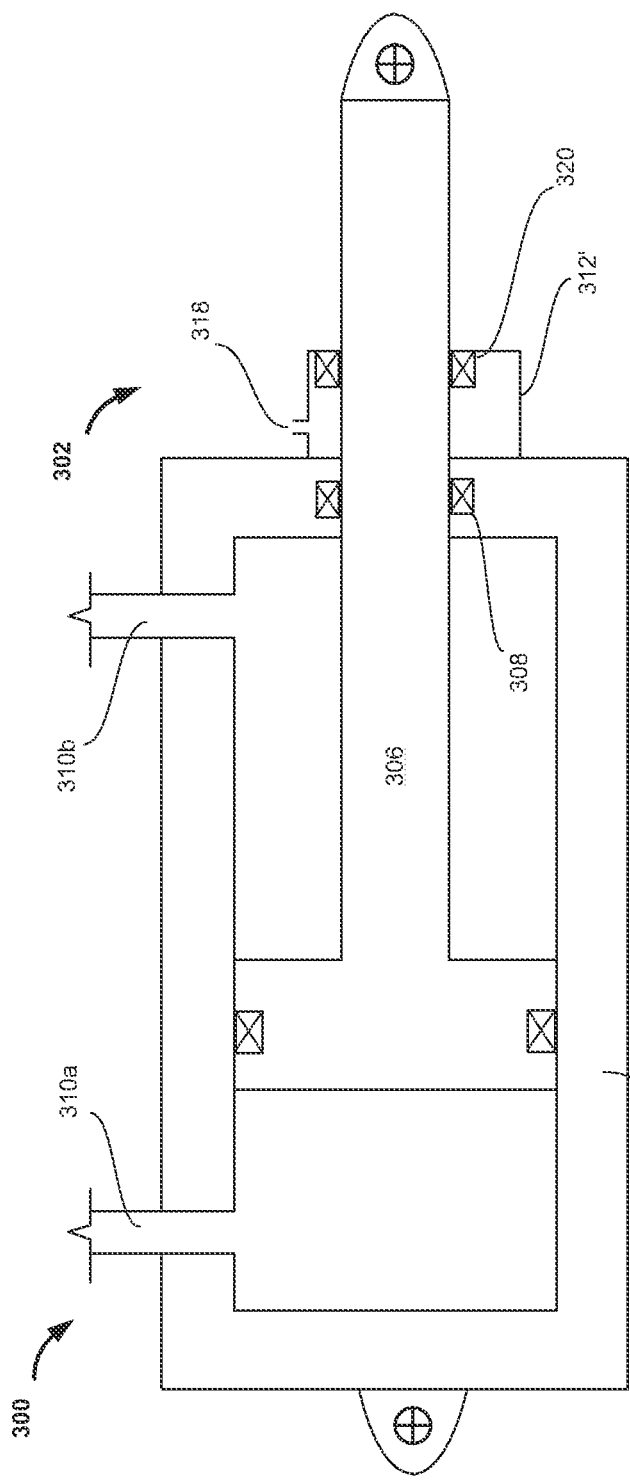
FIG. 3C is a partial cross-sectional side view of an example actuator with an example actuator monitoring system.

Actuator dynamic seals leak. The example actuator monitoring system 302 identifies when a predetermined volume of fluid has leaked past the dynamic seal 308. The identification allows an operator to determine whether the actuator 300 needs repair or whether such leakage is normal. The example actuator monitoring system 302 collects and monitors fluid leakage past the dynamic actuator seal 308 of the example actuator 300. Referring to both FIGS. 3A and 3B, the example actuator monitoring system 302 includes a body member 312, a fluid collection member 314 included in the body member 312, a fluid level indication housing 316, a vent port 318 (e.g., port) in the body member 312, a seal 320 in the body member 312, and a retainer 322 to hold the seal 320 to the body member 312. FIG. 3A shows the body member 312 as a cylindrical extension from the actuator housing 304 that surrounds the dynamic actuator seal 308 and a portion of the shaft 306 to capture fluid that leaks past the dynamic actuator seal 308. In some implementations, the body member 312 is centered on and coincides with the cylindrical shaft 306 and dynamic actuator seal 308. The body member 312 has a periphery that matches a periphery of the actuator housing 304, for example, the body member 312 has an outer diameter equal to an outer diameter of the actuator housing 304. In some implementations, such as depicted in FIG. 3C, a body member 312' is not centered on and/or does not coincide with the shaft 306 and dynamic actuator seal 308, and/or does not have a periphery that matches the periphery of the actuator housing 304. For example, the body member can be an extension with a periphery that extends more outwardly, more inwardly, or a combination of more outwardly and more inwardly than the periphery of the actuator housing 304. The body member 312 can have a smaller diameter than the actuator housing 304, while surrounding the dynamic actuator seal 308. In other implementations, the body member 312 is an extension from the actuator housing 304 that surrounds the dynamic seal 308 and is not cylindrical. In some instances, the body member 312 is shaped to bias leaked fluid past the dynamic seal 308 to flow towards the fluid collection member 314 and/or the fluid level indication housing 316.

Referring back to FIGS. 3A and 3B, the fluid collection member 314 receives the fluid that leaks past the dynamic actuator seal 308 and into the body member 312. The fluid collection member 314 connects the fluid level indication housing 316 to the body member 312 such that the fluid received by the fluid collection member 314 is captured in the fluid level indication housing 316. The fluid collection member 314 can take many forms. In the example shown in FIG. 3A, the fluid collection member 314 is a cylindrical pipe connected on one end to the body member 312 and on another end to the fluid level indication housing 316. In some implementations, the fluid collection member 314 can mate (e.g., with threads or otherwise) with the body member 312 and/or the fluid level indication housing 316. In other implementations, the fluid collection member 314 is a funnel attached on one end to an opening in the body member 312 and on another end to the fluid level indication housing 316. In further implementations, the fluid collection member 314 includes a different attachment to connect the body member 312 and the fluid level indication housing 316. The body member 312 can include a funnel at a connection point to the fluid collection member 314 to bias the fluid in the body member 312 to flow towards the fluid collection member 314. In certain implementations of the actuator monitoring system 302, the fluid collection member 314 is excluded, and the fluid level indication housing 316 mounts directly to the body member 312 without the fluid collection member 314 such that fluid level indication housing 316 receives the fluid that leaks past the dynamic actuator seal 308 and into the body member 312 through an opening in the body member 312 that leads to the fluid level indication housing 316.

Figure 3D:
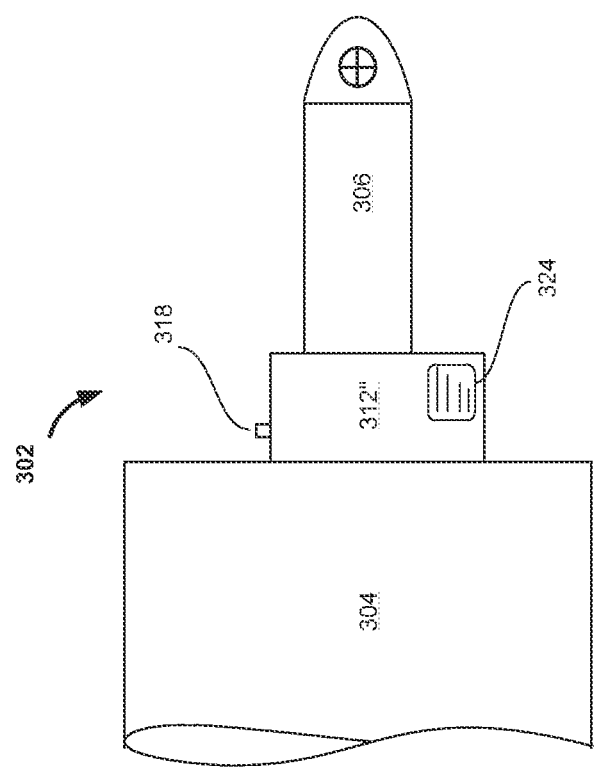
FIG. 3D is a partial side view of a partial example actuator monitoring system that can be used in the example actuator monitoring system of FIG. 3C.

In certain implementations of the actuator monitoring system 302, the fluid collection member 314 and the fluid level indication housing 316 are excluded. For example, FIG. 3C shows the actuator monitoring system 302 without a fluid collection member or fluid level indication housing. In other implementations of the actuator monitoring system 302, the fluid level indication housing 316 is integral to the body member 312, or a different fluid level indicator is used. For example, as depicted in FIG. 3D, a transparent member 324 (e.g., sight glass, transparent surface of body member, etc.) can be integral to the body member 312" to view accumulated fluid leakage collected in body member 312".

In some implementations, the actuator 300 includes more than one actuator shaft 306 and more than one dynamic actuator seal 308. In these implementations, the actuator monitoring system 302 can include one or more body members 312, one or more fluid collection members 314, one or more fluid level indication housings 316, and/or one or more transparent members 324.

The fluid level indication housing 316 indicates that a predetermined volume of fluid leaked past the dynamic actuator seal 308 has been collected. The fluid level indication housing 316 includes a receptacle to hold fluid from the fluid collection member 314. In some implementations, the fluid level indication housing 316 includes a marking at a position that corresponds to the predetermined volume of fluid. For example, the receptacle of the fluid level indication housing 316 can include a sight glass with at least one graduation marking corresponding to the predetermined volume of fluid so that a user can observe a volume of fluid captured in the fluid level indication housing 316. In some implementations, the fluid level indication housing 316 includes multiple markings corresponding to different volumes in the receptacle. For example, the fluid level indication housing 316 can include multiple markings on a generally vertical surface of the receptacle, where each marking corresponds to a different internal volume of the fluid level indication housing 316. The fluid level indication housing 316 is removable from the fluid collection member 314, for example, so that fluid captured in the fluid level indication housing 316 can be extracted from the fluid level indication housing 316, and the fluid level indication housing 316 can be reconnected to the fluid collection member 314. In some implementations, the fluid collection member 314 and fluid level indication housing 316 are a single unit, such that the fluid collection member 314 and fluid level indication housing 316 are removable from the body member 312, for example, via threading on the body member 312 and the fluid collection member 314 and/or otherwise.

The vent 318 in the body member 312 vents pressure generated by actuation motion (e.g., translation) of the shaft. The vent 318 includes an opening in the body member 312 connecting an interior volume of the body member 312 to an ambient pressure exterior to the body member 312. The opening of the vent 318 is small compared to the body member 312. In some implementations, the vent 318 includes a flap over the opening in the body member 312 such that pressure can vent through the flap but fluid cannot permeate into or out of the body member 312 through the flap of the vent 318.

The seal 320 in the body member 312 seals captured fluid that leaks past the dynamic actuator seal 308 and into the body member 312. The seal 320 is a dynamic seal housed against the body member 312 and around the shaft 306. The seal 320 is retained in place by the retainer 322. FIG. 3B shows the retainer as a circular retention ring around the shaft 306 and against the seal 320. In some implementations, the retainer 322 is a groove formed in the body member 312, or a combination of a retaining ring and a groove formed in the body member 312. In other implementations, the retainer 322 is a different retaining element configured to hold the seal to the body member 312 and the shaft 306.

Figure 4:
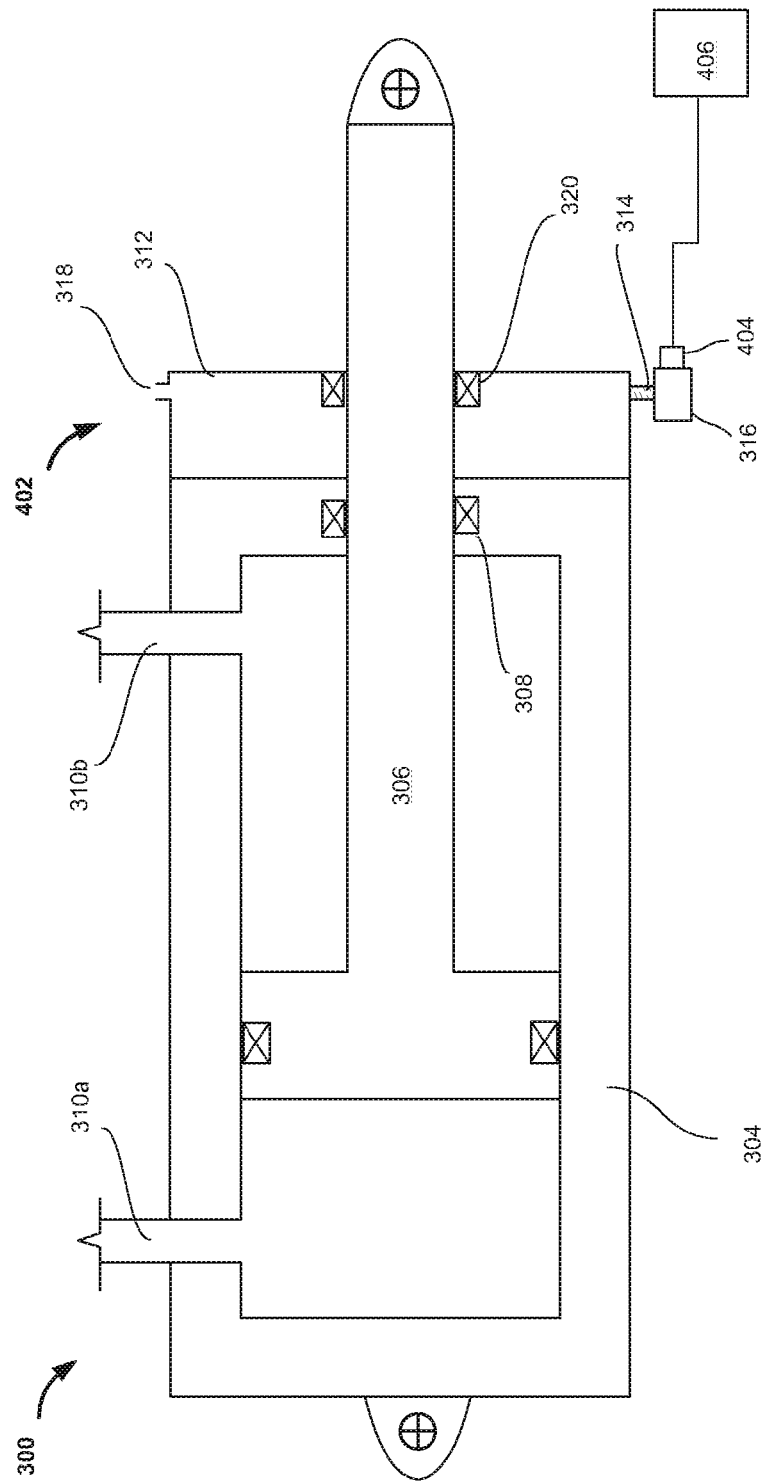
FIG. 4 is a partial cross-sectional side view of an example actuator with an example actuator monitoring system.

As shown in FIG. 4, the example actuator 300 with an example actuator monitoring system 402 that can be used in the actuator assembly of FIGS. 1 and 2 is shown in a partial cross-sectional side view. The example actuator monitoring system 402 is like the example actuator monitoring system 302 of FIGS. 3A and 3B, except the example actuator monitoring system 402 includes a signal transmission system 404 and a computer system 406 connected to the signal transmission system 404. The signal transmission system 404 transmits a signal in response to the volume of fluid in the fluid level indication housing 316. The signal transmission system 404 transmits the signal to the computer system 406, for example, when the volume of fluid in the fluid level indication housing 316 reaches the predetermined volume of fluid.

When the volume of fluid in the fluid level indication housing 316 reaches the predetermined volume of fluid, a decision is made regarding whether the actuator 300 needs to be analyzed (e.g., repaired or otherwise evaluated). In some instances, the time it takes for the specified volume of fluid to leak past the dynamic actuator seal 308 factors into the decision regarding whether the actuator 300 needs to be analyzed. For example, a shorter amount of time for the leaked fluid to reach the predetermined volume of fluid relative to an expected amount of time may correspond to a greater likelihood that the actuator requires repair or replacement. In an alternative example, a longer amount of time for the leaked fluid to reach the predetermined volume of fluid relative to an expected amount of time may correspond to a lesser likelihood that the actuator requires repair or replacement. The time it takes for the specified volume of fluid to leak past the dynamic actuator seal 308 can also be affected by factors such as operations performed by the rotorcraft and/or conditions (e.g., environmental conditions) under which the operations were performed.

The operation of a rotorcraft can factor into the analysis of the actuator 300 on the rotorcraft. The computer system 406 can be used to gather a history of the rotorcraft's operation. The computer system 406 is configured to receive the signal from the signal transmission system 404, receive multiple parameters representing operation of a rotorcraft in which the actuator 400 and actuator monitoring system 402 is installed, and determine if a repair of the actuator 400 is necessary based at least in part on the signal and one or more of the plurality of parameters. In some implementations, the computer system includes one or more processors and a computer-readable medium that stores computer instructions executable by the one or more processors. For example, the computer system 406 receives a signal in response to the fluid level indication housing indicating that the predetermined volume of fluid that leaked past the dynamic machine actuator seal has been collected, receives multiple machine parameters associated with a rotorcraft operation, and determines if the machine actuator needs maintenance based in part on the received signal and one or more of the rotorcraft parameters.

The machine parameters include, for example, a number of hours a corresponding rotorcraft was operational in the air, a number of hours the rotorcraft was non-operational on the ground, a number of inches of stroke moved by the machine actuator (e.g., shaft 306), a number of directions of the actuator reversal, an ambient temperature of operation, a fluid temperature of operation, the rotorcraft mission profile, or a combination of these machine parameters. The computer system 406 receives the signal and the machine parameters, and provides maintenance results (e.g., fluid leakage accumulation, rotorcraft usage, or other maintenance results). In some instances, the computer system 406 logs data regarding the machine parameters and accumulation of fluid into a database. The database can be accessed by a user (e.g., maintenance operator) to view historical rotorcraft data, correlations between rotorcraft operation and fluid leakage accumulation past an actuator seal, and/or other data pertaining to the rotorcraft. A maintenance operator can perform a maintenance analysis on a rotorcraft actuator based on the information in the computer system.

The signal transmission system 404 can be implemented in different ways. In some implementations, the signal transmission system 404 includes an electrical signal transmitter connected to the fluid level indication housing 316, and the transmitted signal is an electrical signal. The signal transmission system 404 can include sensors integrated with the fluid level indication housing 316 to determine that a fluid level has reached a fluid level indicator in the fluid level indication housing 316 corresponding to a certain volume of fluid, such as the predetermined volume of fluid. For example, the sensors can include a position sensor, level sensor, altimeter, proximity sensor, charge-coupled device, optical sensor, a combination of these, or another type of sensor.

In some implementations, the signal transmission system 404 includes an optical system connected to the fluid level indication housing 316, and the transmitted signal is an optical signal. For example, the optical system can include fiber optic components, where the optical signal is transmitted through an optical fiber. The optical signal can be modulated in response to the fluid in the fluid level indication housing 316 reaching a fluid level indicator corresponding to the predetermined volume of fluid, where the optical system is generated by a photocell.

In some implementations, the signal transmission system 404 includes a sonic system connected to the fluid level indication housing 316, where the sonic system monitors a resonance frequency of the fluid collection member 314. The sonic system can be configured to transmit signal in response to determining that the monitored resonance frequency of the fluid collection member 314 substantially matches a baseline resonance frequency of the fluid level indication housing 316 filled with the predetermined volume of fluid.

Figure 5:
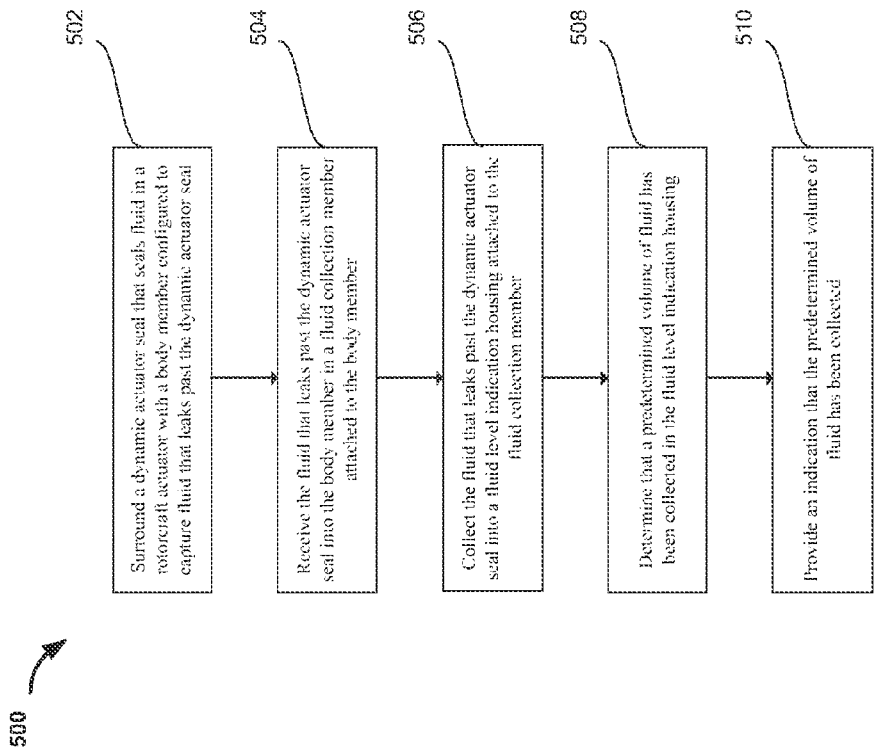
FIG. 5 is a flowchart describing a method for monitoring leakage past a dynamic actuator seal of a rotorcraft actuator.

FIG. 5 is a flow chart describing a method 500 for monitoring leakage past a dynamic actuator seal of a rotorcraft actuator, for example, performed by the example actuator monitoring system 402. At 502, the dynamic actuator seal of the rotorcraft actuator is surrounded by a body member configured to capture fluid that leaks past the dynamic actuator seal. At 504, the fluid that leaks past the dynamic actuator seal is received in a fluid collection member attached to the body member. At 506, the fluid that leaks past the dynamic actuator seal is collected in a fluid level indication housing attached to the fluid collection member. At 508, a predetermined volume of fluid is determined to have been collected in the fluid level indication housing. In some instances, the signal transmission system 404 sends a signal to the computer system 406 when the predetermined volume of fluid is collected in the fluid level indication housing 316. In other instances, a user viewing the fluid level indication housing 316 determines that the predetermined volume of fluid is collected in the fluid level indication housing 316 by comparing the level of fluid in the fluid level indication housing 316 to a marking or markings on the fluid level indication housing 316 corresponding to the predetermined volume of fluid. At 510, an indication that the predetermined volume of fluid has been collected is provided. In some implementations, a determination of whether a rotorcraft actuator needs maintenance is based on the amount of fluid leakage past a dynamic seal of the rotorcraft actuator, and based on one or more rotorcraft parameters related to operation of the rotorcraft.

A number of implementations have been described. Nevertheless, it will be understood that various modifications may be made without departing from the spirit and scope of the disclosure.

What is claimed is:

1. A rotorcraft actuator monitoring system to monitor leakage past dynamic rotorcraft actuator seals of a rotorcraft actuator having a shaft, the system comprising:
   the rotorcraft actuator having the shaft configured to translate along a longitudinal axis;
   a body member mounted to surround a dynamic rotorcraft actuator seal that seals fluid in the rotorcraft actuator, the body member having a fluid collection member to capture and hold fluid that leaks past the dynamic rotorcraft actuator seal;
   a seal around the shaft in an exterior portion of the body member where the shaft of the rotorcraft actuator extends through the exterior portion of the body member;
   a retainer to retain the seal in the body member;
   a vent port connected to the body member to vent pressure generated by actuating motion of the shaft along the longitudinal axis within the body member;
   a fluid level indication housing connected to the fluid collection member to collect the fluid captured by the fluid collection member, the fluid level indication housing to indicate that a predetermined volume of fluid that leaked past the dynamic rotorcraft actuator seal has been collected, the fluid level indication housing being removably attached to the body member.

2. The system of claim 1, further comprising a signal transmission system connected to the fluid level indication housing, the signal transmission system to transmit a signal in response to the fluid level indication housing indicating that the predetermined volume of fluid that leaked past the dynamic rotorcraft actuator seal has been collected.

3. The system of claim 2, wherein the signal transmission system comprises an electrical signal transmitter connected to the fluid level indication housing, and wherein the signal includes an electrical signal.

4. The system of claim 2, wherein the signal transmission system comprises an optical system connected to the fluid level indication housing, and wherein the signal includes an optical signal.

5. The system of claim 4, wherein the optical system comprises a fiber optic system and wherein the optical signal transmitted through an optical fiber of the fiber optic system is modulated in response to the condition that the predetermined volume of fluid that leaked past the dynamic rotorcraft actuator seal has been collected in the fluid level indication housing.

6. The system of claim 5, wherein the optical system comprises a photocell to generate the optical signal in response to the fluid level indication housing indicating that the predetermined volume of fluid that leaked past the dynamic rotorcraft actuator seal has been collected.

7. The system of claim 2, wherein the signal transmission system comprises a sonic system connected to the fluid level indication housing, the sonic system configured to monitor a resonance frequency of the fluid collection member.

8. The system of claim 7,
   wherein the sonic system is configured to transmit the signal in response to determining that the monitored resonance frequency of the fluid level indication housing matches a baseline resonance frequency of the fluid level indication housing filled with the predetermined volume of fluid.

9. The system of claim 8, wherein the sonic system is configured to transmit the signal in response to determining that the monitored resonance frequency of the fluid level indication housing exactly matches the baseline resonance frequency of the fluid level indication housing filled with the predetermined volume of fluid.

10. The system of claim 2, further comprising a computer system connected to the signal transmission system, the computer system configured to:
    receive the signal from the signal transmission system;
    receive a plurality of parameters representing operation of the rotorcraft in which the actuator is installed; and
    determine if a repair of the rotorcraft actuator is necessary based, in part, on the signal, one or more of the plurality of parameters and the history of the rotorcraft's operation.

11. The system of claim 1, wherein the fluid level indication housing includes a marking at a position that corresponds to the predetermined volume of fluid.

12. The system of claim 1, wherein the fluid level indication housing includes a plurality of graduation markings to identify a volume of fluid that the fluid level indication housing has collected.

13. The system of claim 1, wherein the retainer includes at least one of a retention ring or a groove formed in the body member.

14. An actuator monitoring system to monitor leakage past dynamic actuator seals of a rotorcraft machine actuator, the system comprising:
- the rotorcraft machine actuator having a shaft configured to translate along a longitudinal axis;
- a body member mounted to surround a dynamic machine actuator seal that seals fluid in the rotorcraft machine actuator, the body member to capture and hold fluid that leaks past the dynamic machine actuator seal;
- a fluid collection member included in the body member to receive the fluid that leaks past the dynamic machine actuator seal into the body member;
- a fluid level indication housing attached to the fluid collection member to collect the fluid received by the fluid collection member, the fluid level indication housing to indicate that a predetermined volume of fluid that leaked past the dynamic machine actuator seal has been collected; and
- a computer system comprising:
  - one or more processors; and
  - a non-transitory computer-readable medium storing computer instructions executable by the one or more processors to perform operations comprising:
    - receiving a signal in response to the fluid level indication housing indicating that the predetermined volume of fluid that leaked past the dynamic machine actuator seal has been collected;
    - receiving a plurality of machine parameters, each machine parameter associated with a rotorcraft operation, and comprising at least a number of inches of stroke moved by the machine actuator and a number of directions of the actuator reversal;
    - gathering a history of the rotorcraft's operation based on the received plurality of machine parameters;
    - presenting the history of the rotorcraft's operation, the machine parameters, and the signal indicating the volume of fluid to a database;
    - determining whether a maintenance analysis is required based on the indication that the predetermined volume of fluid has been collected, one or more of the machine parameters and the history of the rotorcraft's operation; and
    - whenever the maintenance analysis is required, determining if the machine actuator needs maintenance based, in part, on the received signal and one or more of the machine parameters.

15. The system of claim 14, further comprising a signal transmission system connected to the fluid level indication housing, the signal transmission system to transmit the signal in response to the fluid level indication housing indicating that the predetermined volume of fluid that leaked past the dynamic machine actuator seal has been collected.

16. The system of claim 14, wherein the machine is a rotorcraft, and wherein the machine parameters further comprises a number of hours for which the rotorcraft was operational in the air, a number of hours for which the rotorcraft was non-operational on the ground, an ambient temperature of operation, a fluid temperature of operation, or the rotorcraft mission profile.

17. A method for monitoring leakage past a dynamic actuator seal of a rotorcraft actuator, the method comprising:
- providing the rotorcraft actuator having a shaft configured to translate along a longitudinal axis;
- surrounding a dynamic actuator seal that seals fluid in the rotorcraft actuator with a body member configured to capture and hold fluid that leaks past the dynamic actuator seal;
- receiving the fluid that leaks past the dynamic actuator seal into the body member in a fluid collection member attached to the body member;
- collecting the fluid that leaks past the dynamic actuator seal into a fluid level indication housing attached to the fluid collection member;
- determining that a predetermined volume of fluid has been collected in the fluid level indication housing;
- providing an indication that the predetermined volume of fluid has been collected;
- receiving a plurality of machine parameters using a computer system, each machine parameter associated with a rotorcraft operation, and comprising at least a number of inches of stroke moved by the machine actuator and a number of directions of the actuator reversal;
- gathering a history of the rotorcraft's operation based on the received plurality of machine parameters using the computer system;
- determining whether a maintenance analysis is required based on the indication that the predetermined volume of fluid has been collected, one or more of the machine parameters and the history of the rotorcraft's operation; and
- whenever the maintenance analysis is required, determining if the rotorcraft actuator needs maintenance based, in part, on the indication that the predetermined volume of fluid has been collected, one or more of the machine parameters and the history of the rotorcraft's operation.

18. The method of claim 17, further comprising:
- receiving a signal in response to receiving the indication that the predetermined volume of fluid that leaked past the dynamic actuator seal has been collected; and
- wherein determining whether the maintenance analysis is required and determining if the rotorcraft actuator needs maintenance are based, in part, on the received signal.

19. The method of claim 17, further comprising determining an amount of time elapsed for the predetermined volume of fluid to be collected in the fluid level indication housing; and
- wherein determining whether the maintenance analysis is required and determining if the rotorcraft actuator needs maintenance are based, in part, on the determined amount of time elapsed.

* * * * *